(12) United States Patent
Khandekar et al.

(10) Patent No.: US 8,503,421 B2
(45) Date of Patent: Aug. 6, 2013

(54) ENHANCED FREQUENCY DIVISION MULTIPLE ACCESS FOR WIRELESS COMMUNICATION

(75) Inventors: Aamod Dinkar Khandekar, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 13/106,990

(22) Filed: May 13, 2011

(65) Prior Publication Data
US 2011/0216704 A1 Sep. 8, 2011

Related U.S. Application Data

(63) Continuation of application No. 11/431,970, filed on May 10, 2006, now Pat. No. 8,077,692.

(60) Provisional application No. 60/710,418, filed on Aug. 22, 2005, provisional application No. 60/691,870, filed on Jun. 16, 2005, provisional application No. 60/683,290, filed on May 20, 2005.

(51) Int. Cl.
*H04W 4/00* (2009.01)
(52) U.S. Cl.
USPC ........................................ 370/344; 370/208
(58) Field of Classification Search
USPC .................. 370/203, 208, 252, 328, 329, 344
See application file for complete search history.

(56) References Cited

U.S. PATENT DOCUMENTS

| 7,110,349 B2 | 9/2006 | Branlund et al. |
| 7,221,653 B2 | 5/2007 | Vanghi |
| 8,077,692 B2 | 12/2011 | Khandekar et al. |
| 2002/0060984 A1 | 5/2002 | Michon et al. |

(Continued)

FOREIGN PATENT DOCUMENTS

| JP | 2005502218 A | 1/2005 |
| WO | 0249305 A2 | 6/2002 |

(Continued)

OTHER PUBLICATIONS

David Falconer., at al., "Frequency Domain Equalization for Single-Carrier Broadband Wireless Systems" IEEE Communications Magazine, IEEE Service Center, Piscataway, US, vol. 40, Apr. 1, 2002, pp. 58-66, XP011092809 ISSN: 0163-6804, p. 62, left-hand column, figure 7.

(Continued)

*Primary Examiner* — Sam Bhattacharya
(74) *Attorney, Agent, or Firm* — Donald C. Kordich

(57) ABSTRACT

Enhanced frequency division multiple access (EFDMA) is a multiplexing scheme that sends modulation symbols in the time domain and achieves a lower PAPR than OFDM. An EFDMA symbol occupies multiple subband groups that are spaced apart in a frequency band, with each subband group containing multiple adjacent subbands. To generate an EFDMA symbol, multiple modulation symbols are mapped onto a first sequence of symbols. A transform (e.g., a DFT) is performed on the first sequence to obtain a second sequence of values. The values in the second sequence corresponding to the subbands used for the EFDMA symbol are retained, and the remaining values are zeroed out to obtain a third sequence of values. An inverse transform (e.g., an IDFT) is performed on the third sequence to obtain a fourth sequence of samples. A phase ramp may be applied on the fourth sequence, and a cyclic prefix is appended to form the EFDMA symbol.

27 Claims, 12 Drawing Sheets

U.S. PATENT DOCUMENTS

| | | |
|---|---|---|
| 2004/0062193 A1 | 4/2004 | Ma et al. |
| 2005/0025039 A1 | 2/2005 | Hwang et al. |
| 2006/0268676 A1 | 11/2006 | Gore et al. |
| 2006/0291470 A1 | 12/2006 | Khandekar et al. |

FOREIGN PATENT DOCUMENTS

| | | |
|---|---|---|
| WO | 0249306 A2 | 6/2002 |
| WO | WO0249306 | 6/2002 |
| WO | 2006127544 A2 | 11/2006 |
| WO | WO2006127544 A2 | 11/2006 |

OTHER PUBLICATIONS

European Search Report—EP09163209—Search Authority—Munich—Aug. 25, 2010.
Gusmao A., et al., "Comparison of Two Modulation Choices for Broadband Wireless Communications" VTZ 2000-Spring. 2000 IEEE 51st. Vehicular Technology Conference Proceedings. Tokyo, Japan, May 15-18, 2000; [IEEE Vehicular Technology Conference], New York, NY: IEEE, US, vol. CONF. 51, May 15, 2000, pp. 1300-1305, XP000968080, ISBN: 978-0-7803-5719-8, p. 1305, left-hand column, section V, last paragraph.
International Preliminary Report on Patentability—PCT/US06/019639, The Interntional Bureau of WIPO, Geneva, Switzerland, Nov. 23, 2007.
M Ran, et al., "A mixed OFDM Downlink and Single Carrier Uplink for the 2-11 GHZ Licensed Bands" IEEE 802. 16 Broadband Wireless Access Working Group, [Online] Aug. 30, 2002, XP002550549, the whole document.
Taiwanese Search Report—095118026—TIPO—Feb. 4, 2010.
3GPP presentation by NTT DoCoMO.
David Falconer., et al., "Frequency Domain Equalization for Single-Carrier Broadband Wireless Systems" IEEE Communications Magazine, IEEE Service Center, Piscataway, US, vol. 40, No. 4, Apr. 1, 2002, pp. 58-66, XP011092809 ISSN: 0163-6804, p. 62, left-hand column, figure 7.
European Search Report—EP09163209, Search Authority—Berlin Patent Office, Aug. 25, 2010.
European Search Report—EP10011376—Search Authority—Munich—Jan. 17, 2011.
Falconer D. D., et al., "Broadband Wireless Using Single Carrier and Frequency Domain Equalization" Wireless Personal Multimedia Communications, 2002. The 5th International Symposium on Oct. 27-30, 2002, Piscataway, NJ, USA, IEEE, vol. 1, Oct. 27, 2002, pp. 27-36, XP010619043, ISBN: 978-0-7803-7442-3, p. 34, left-hand column; figure 7.
Gusmao A., et al., "Comparison of Two Modulation Choices for Broadband Wireless Communications" VTC 2000-Spring. 2000 IEEE 51st. Vehicular Technology Conference Proceedings. Tokyo, Japan, May 15-18, 2000; [IEEE Vehicular Technology Conference], New York, NY: IEEE, US, vol. Conf. 51, May 15, 2000, pp. 1300-1305, XP000968080, ISBN: 978-0-7803-5719-8, p. 1305, left-hand column, section V, last paragraph.
International Preliminary Report on Patentability—PCT/US06/019639, The International Bureau of WIPO, Geneva, Switzerland, Nov. 23, 2007.
International Search Report—PCT/US06/019639, International Search Authority—European Patent Office, Jan. 4, 2007.
M Ran, et al., "A mixed OFDM Downlink and Single Carrier Uplink for the 2-11 GHZ Licensed Bands" IEEE 802.16 Broadband Wireless Access Working Group, [Online] Aug. 30, 2002, XP002550549, the whole document.
Motorola,"Uplink Numerology and Frame Structure", 3GPP TAG RAN1 #41 Meeting R1-050397, May 13, 2005.
Taiwanese Search Report—095118026—TIP0—Feb. 4, 2010.
Written Opinion—PCT/US06/019639, International Search Authority—European Patent Office, Jan. 4, 2007.
Partial European Search Report—EP09163209—Search Authority—Berlin—Oct. 15, 2009.

ENHANCED FREQUENCY DIVISION MULTIPLE ACCESS FOR WIRELESS COMMUNICATION

CLAIM OF PRIORITY UNDER 35 U.S.C. §119 AND §120

The present application is a Continuation Application which claims priority to U.S. patent application Ser. No. 11/431,970, filed May 10, 2006, which claims priority to Provisional Application No. 60/683,290 filed May 20, 2005 and Provisional Application No. 60/691,870 filed Jun. 16, 2005, and Provisional Application No. 60/710,418 filed Aug. 22, 2005, all assigned to the assignee hereof and hereby expressly incorporated by reference herein.

BACKGROUND

I. Field

The present disclosure relates generally to communication and, amongst other things, to data transmission in a wireless communication system.

II. Background

Orthogonal frequency division multiplexing (OFDM) is a multi-carrier multiplexing scheme that partitions a frequency band (e.g., the system bandwidth) into multiple (K) orthogonal subbands. These subbands are also called tones, subcarriers, bins, and so on. With OFDM, each subband is associated with a respective subcarrier that may be independently modulated with data.

OFDM has certain desirable characteristics such as high spectral efficiency and robustness against multipath effects. However, a major drawback with OFDM is a high peak-to-average power ratio (PAPR), which means that the ratio of the peak power to the average power of an OFDM waveform can be high. The high PAPR for the OFDM waveform results from possible in-phase addition of all the subcarriers when they are independently modulated with data. In fact, it can be shown that the peak power can be up to K times greater than the average power for OFDM.

The high PAPR for the OFDM waveform is undesirable and may degrade performance. For example, large peaks in the OFDM waveform may cause a power amplifier to operate in a highly non-linear region or possibly clip, which would then cause intermodulation distortion and other artifacts that can degrade signal quality. The degraded signal quality may adversely affect performance for channel estimation, data detection, and so on.

There is therefore a need in the art for a multiplexing scheme that provides good performance and does not have a high PAPR.

SUMMARY

Techniques to transmit data and pilot using enhanced frequency division multiple access (EFDMA) are described herein. EFDMA is a multiplexing scheme that sends modulation symbols in the time domain, has a lower PAPR than OFDM, and provides other advantages. An EFDMA symbol (which is also called a transmission symbol) is formed with multiple modulation symbols and occupies multiple subband groups that are spaced apart in a frequency band, with each subband group comprising multiple adjacent frequency subbands among the K total subbands.

In an embodiment, to generate an EFDMA symbol, multiple modulation symbols are mapped onto a first sequence of symbols, e.g., at locations determined by the groups of subbands used for the EFDMA symbol. A transform (e.g., a discrete Fourier transform (DFT) or a fast Fourier transform (FFT)) is performed on the first sequence of symbols to obtain a second sequence of values. The values in the second sequence corresponding to the subbands used for the EFDMA symbol are retained, and the remaining values in the second sequence are zeroed out to obtain a third sequence of values. An inverse transform (e.g., an inverse DFT (IDFT) or an inverse FFT (IFFT)) is performed on the third sequence to obtain a fourth sequence of samples. A phase ramp may be applied on the fourth sequence to obtain a fifth sequence of samples. The EFDMA symbol is then generated based on the fifth sequence of samples, e.g., by appending a cyclic prefix. The EFDMA symbol may also be generated in other manners, as described below. A receiver performs the complementary processing to recover the modulation symbols sent in the EFDMA symbol.

Various aspects and embodiments of the disclosure are described in further detail below.

BRIEF DESCRIPTION OF THE DRAWINGS

The features and nature of the present disclosure will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
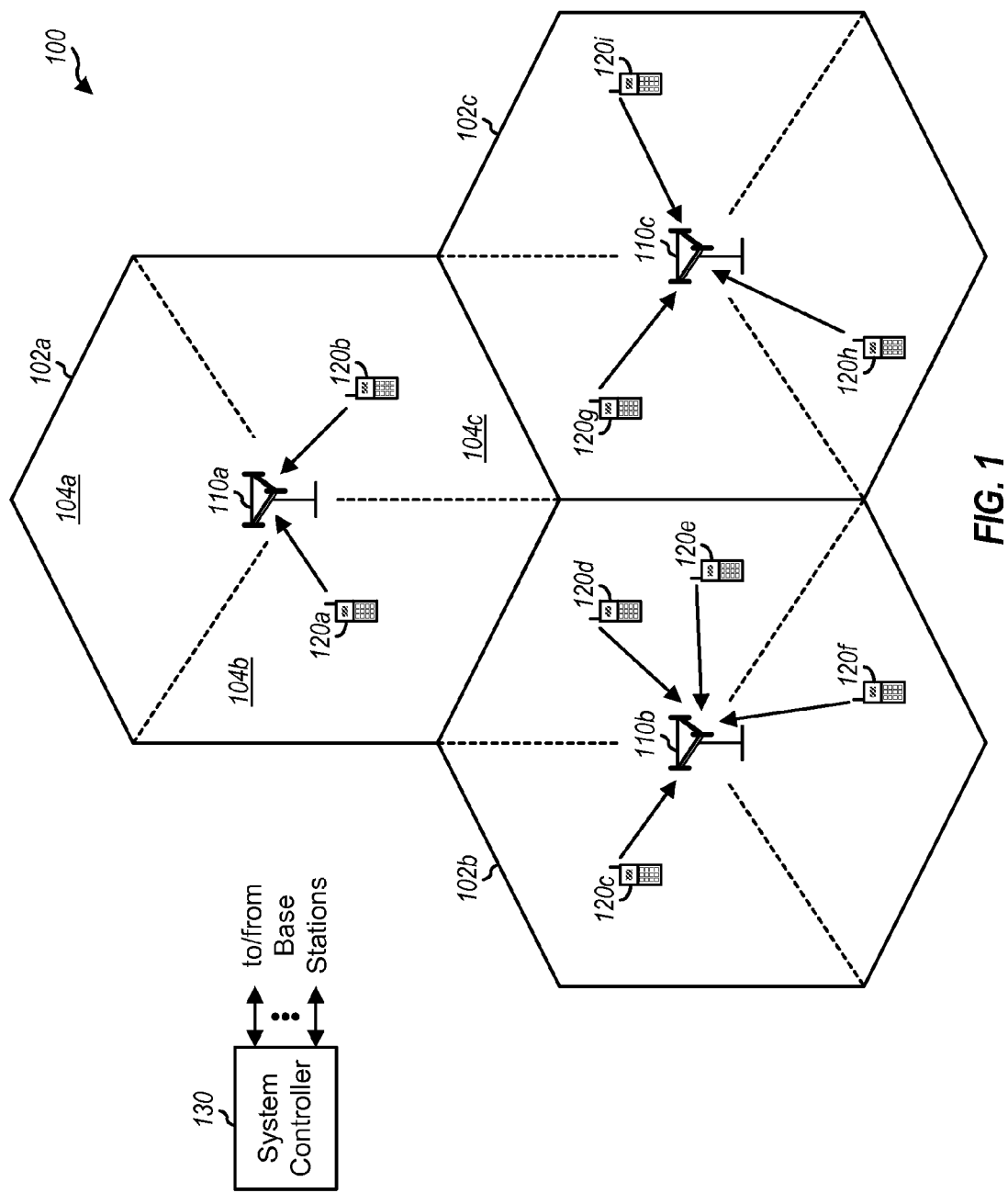
FIG. 1 shows a wireless communication system.

FIG. 1 shows a wireless communication system 100 with multiple base stations 110 and multiple terminals 120. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. These smaller areas are defined by different antenna beams formed by multiple antennas for the base station. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell.

Terminals 120 are typically dispersed throughout the system, and each terminal may be fixed or mobile. A terminal may also be called a mobile station, a user equipment, or some other terminology. A terminal may be a wireless device, a cellular phone, a personal digital assistant (PDA), a wireless modem card, and so on. Each terminal may communicate with one or possibly multiple base stations on the forward and reverse links at any given moment. The forward link (or downlink) refers to the communication link from the base stations to the terminals, and the reverse link (or uplink) refers to the communication link from the terminals to the base stations. For simplicity, FIG. 1 shows only transmissions from the terminals on the reverse link.

In some embodiments, a system controller 130 couples to base stations 110 and provides coordination and control for these base stations. For a distributed architecture, the base stations may communicate with one another as needed.

System 100 may utilize single-carrier frequency division multiple access (SC-FDMA), orthogonal frequency division multiple access (OFDMA), and/or some other multiplexing scheme. SC-FDMA includes interleaved FDMA (IFDMA) which transmits data on subbands that are distributed across a frequency band, localized FDMA (LFDMA) which transmits data on a group of adjacent subbands, and enhanced FDMA (EFDMA) which transmits data on multiple groups of adjacent subbands. IFDMA is also called distributed FDMA, and LFDMA is also called narrowband FDMA, classical FDMA, and FDMA. OFDMA utilizes OFDM. Modulation symbols are sent in the time domain with IFDMA, LFDMA, and EFDMA and in the frequency domain with OFDM. In general, system 100 may utilize one or more multiplexing schemes for the forward and reverse links. For example, system 100 may utilize (1) SC-FDMA (e.g., IFDMA, LFDMA or EFDMA) for both the forward and reverse links (2) one version of SC-FDMA (e.g., EFDMA) for one link and another version of SC-FDMA (e.g., IFDMA) for the other link, (3) SC-FDMA for the reverse link and OFDMA for the forward link, or (4) some other combination of multiplexing schemes. SC-FDMA, OFDMA, and/or some other multiplexing scheme, or a combination thereof may be used for each link to achieve the desired performance. For example, SC-FDMA and OFDMA may be used for a given link, with SC-FDMA being used for some subbands and OFDMA being used on other subbands. It may be desirable to use SC-FDMA on the reverse link to achieve lower PAPR and to relax the power amplifier requirements for the terminals. It may be desirable to use OFDMA on the forward link to potentially achieve higher system capacity.

Figure 2:
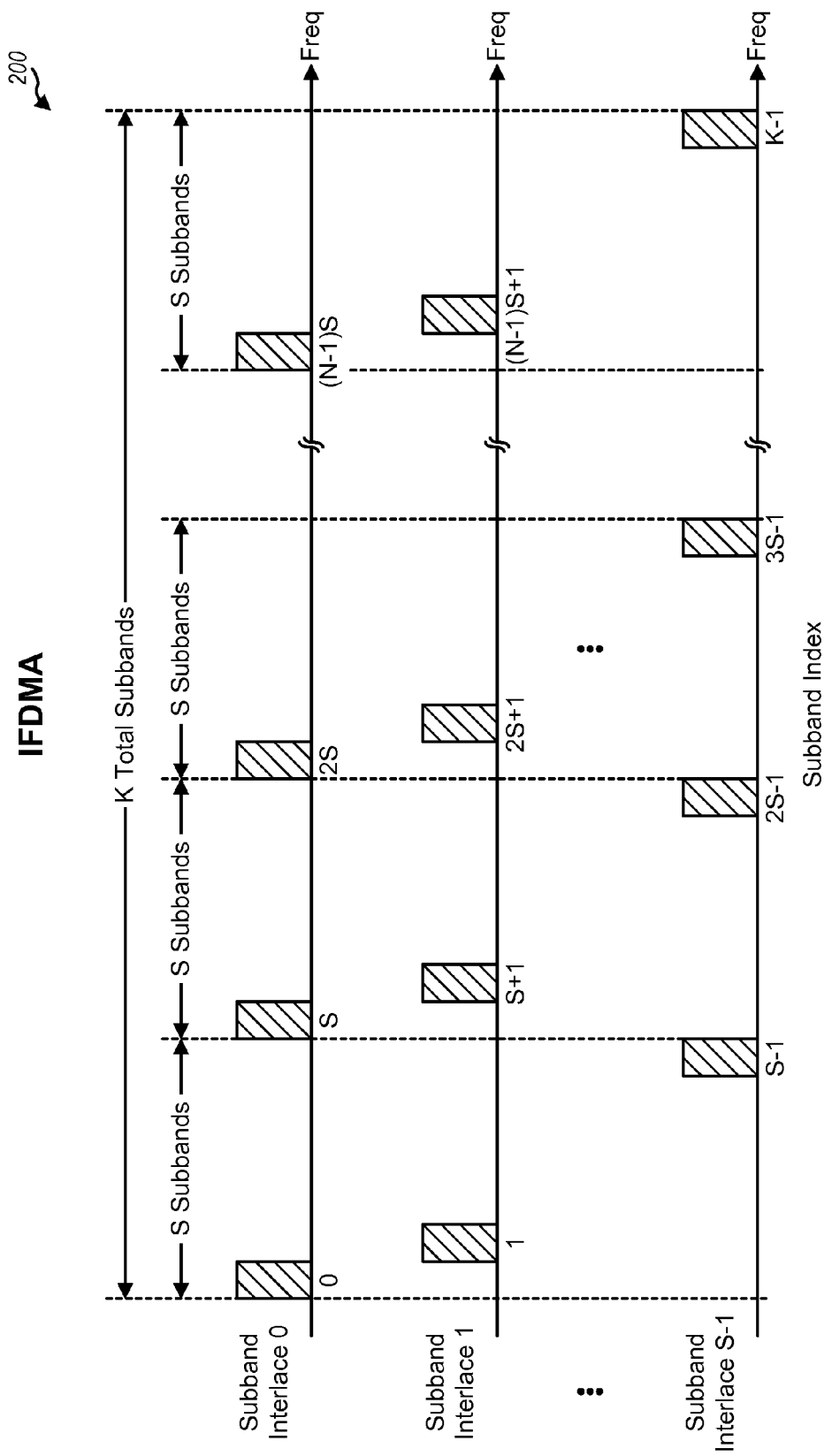
FIG. 2 shows an exemplary subband structure for IFDMA.

FIG. 2 shows an exemplary subband structure 200 for IFDMA. The overall system bandwidth of BW MHz is partitioned into multiple (K) orthogonal subbands that are given indices of 0 through K−1, where K may be any integer value. For simplicity, the following description for IFDMA, LFDMA and EFDMA assumes that all K total subbands are usable for transmission. The spacing between adjacent subbands is BW/K MHz. For subband structure 200, the K total subbands are arranged into S disjoint or non-overlapping interlaces. The S interlaces are disjoint in that each of the K subbands belongs in only one interlace. For subband structure 200, each interlace contains N subbands that are uniformly distributed across the K total subbands, consecutive subbands in each interlace are spaced apart by S subbands, and interlace u contains subband u as the first subband, where K=S·N and u∈{0, ..., S−1}.

Figure 3:
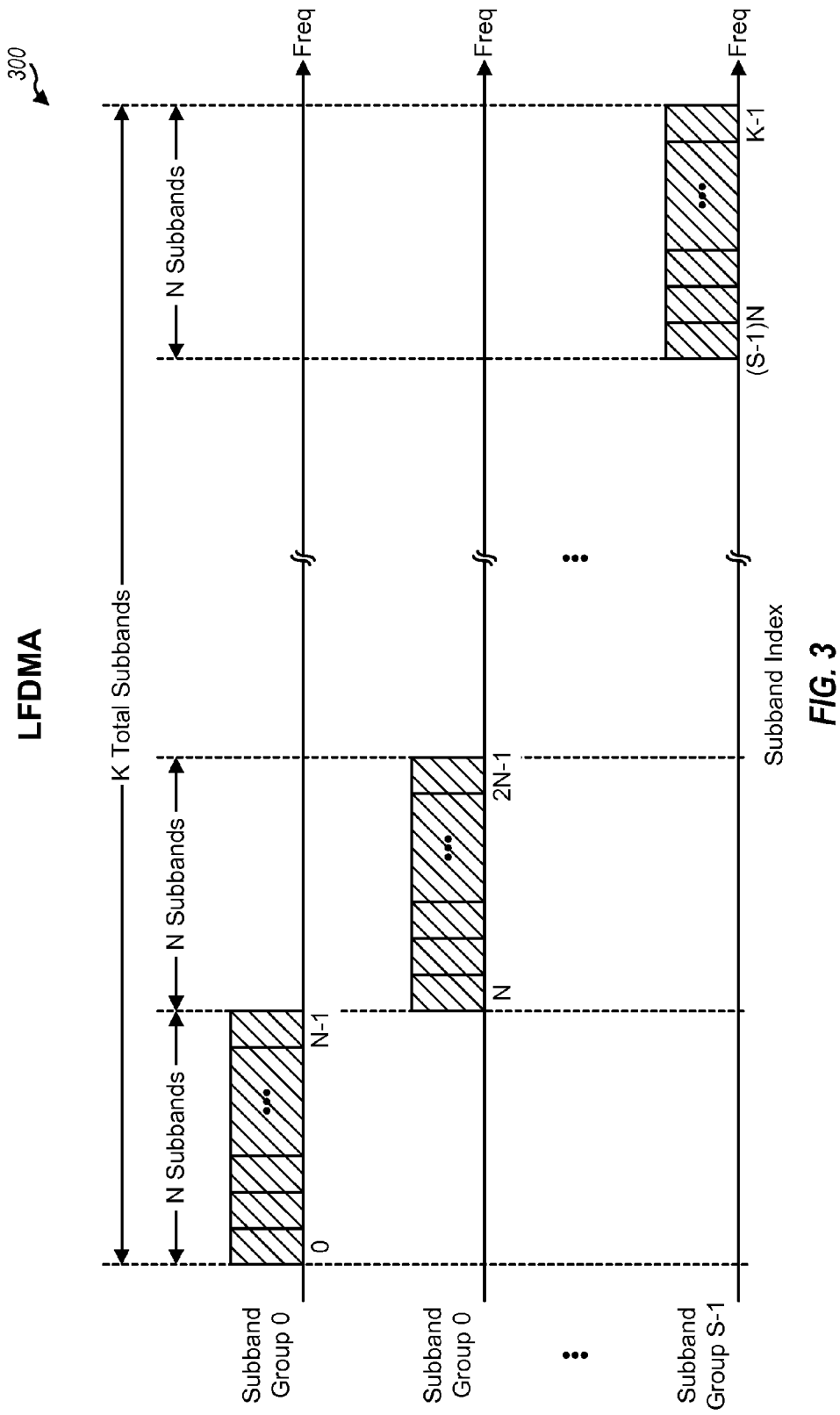
FIG. 3 shows an exemplary subband structure for LFDMA.

FIG. 3 shows an exemplary subband structure 300 for LFDMA. For subband structure 300, the K total subbands are arranged into S non-overlapping groups. Each group contains N adjacent subbands, and group v contains subbands v·N through (v+1)·N−1, where K=S·N and v∈{0, ..., S−1}.

Figure 4:
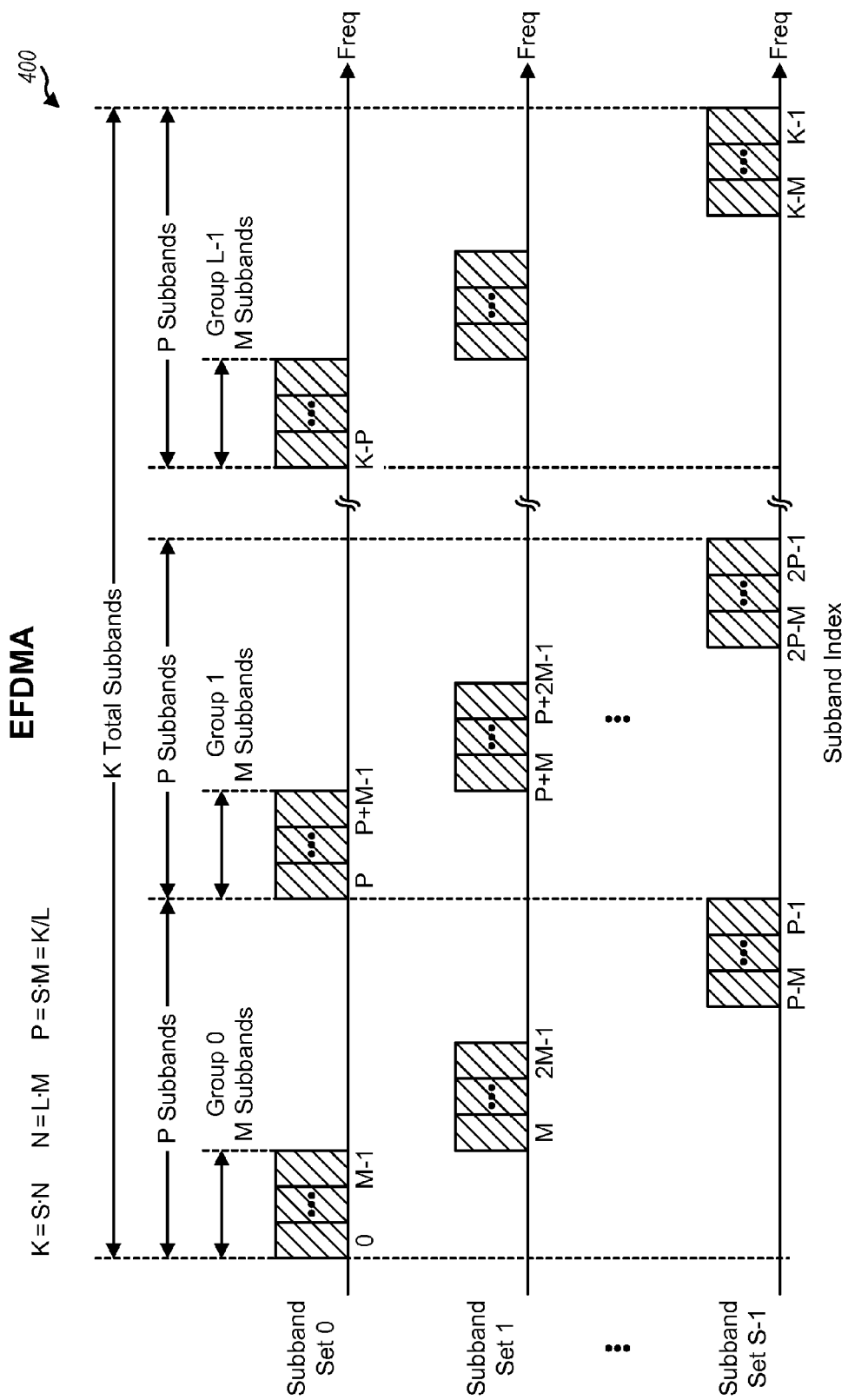
FIG. 4 shows an exemplary subband structure for EFDMA.

FIG. 4 shows an exemplary subband structure 400 for EFDMA. For subband structure 400, the K total subbands are arranged into S non-overlapping sets. In an embodiment, the K total subbands are distributed to the S sets as follows. The K total subbands are first partitioned into multiple (L) frequency ranges, with each frequency range containing P=K/L adjacent subbands. Each frequency range is further partitioned into S groups, with each group containing M adjacent subbands. For each frequency range, the first M subbands are allocated to set 0, the next M subbands are allocated to set 1, and so on, and the last M subbands are allocated to set S−1. Set s, for s=0, ..., S−1, thus includes subbands having indices k that satisfy the following:

$$s \cdot M \leq k \text{ modulo } (K/L) < (s+1) \cdot M. \qquad \text{Eq (1)}$$

For the embodiment described above, each set contains L groups of M adjacent subbands, or a total of N=L·M subbands. The L groups for each set are spaced apart by P subbands. Each subband set thus includes multiple groups of adjacent subbands, with the subband groups being uniformly distributed across the frequency band. The S subband sets may be assigned to up to S different users for transmission.

In general, a subband structure may include any number of sets, each set may contain any number of subband groups and any number of subbands, and the sets may contain the same or different numbers of subbands. For each set, the subband groups may contain the same or different number of subbands and may be distributed uniformly or non-uniformly across the system bandwidth. Furthermore, L, M, S and N may or may not be an integer divisor of K.

EFDMA, IFDMA and LFDMA are SC-FDMA schemes that transmit modulation symbols in the time domain and have low PAPRs that are comparable to the PAPR of a single-carrier system. This is in contrast to OFDM, which transmits modulation symbols in the frequency domain and has a high PAPR. An advantage of IFDMA is that each interlace spans the entire system bandwidth and hence provides frequency diversity. However, the interlace structure is also a disadvantage of IFDMA since it requires the estimation of the entire wideband channel, which may be inefficient for small subband assignment sizes, e.g., for small values of N. LFDMA does not have this disadvantage since a transmission is sent on a group of contiguous subbands. However, LFDMA does not provide frequency diversity due to its narrowband nature. Furthermore, IFDMA and LFDMA typically do not provide interference diversity since a user in a sector may be assigned the same subbands as an interfering user in a neighbor sector. EFDMA can provide the frequency diversity of IFDMA and the channel estimation performance of LFDMA. EFDMA may also provide interference diversity while achieving a lower PAPR than an OFDM-based system.

Figure 5A:
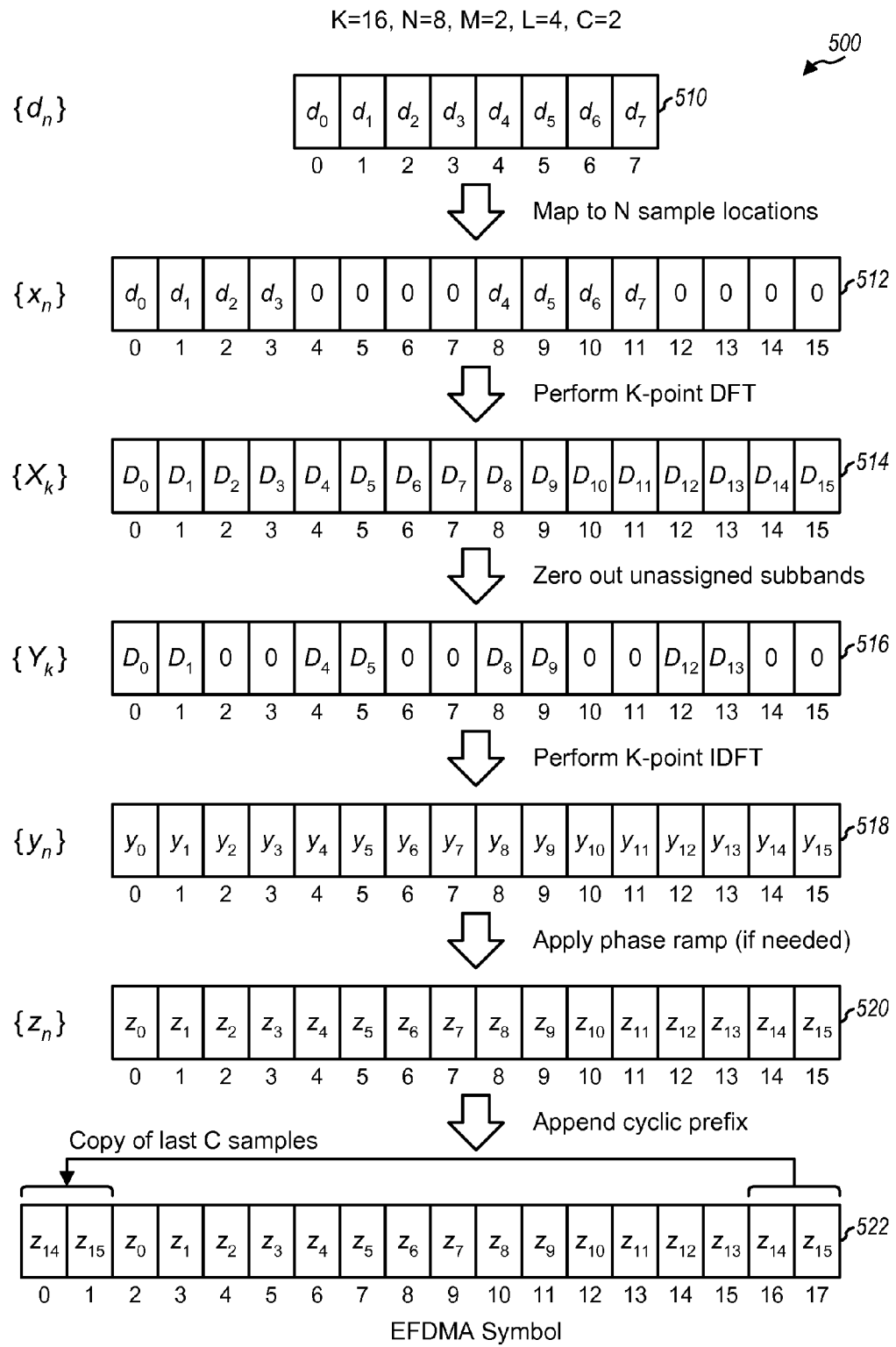
FIGS. 5A and 5B show two processes for generating an EFDMA symbol.

FIG. 5A shows a process 500 for generating an EFDMA symbol for one subband set. For simplicity, FIG. 5A shows a simple case with K=16 total subbands, the subband set containing L=4 subband groups, each group containing M=2 adjacent subbands, and the set containing a total of N=8 subbands. However, other numbers of subbands, subband sets, subband groups, and adjacent subbands may be utilized.

An original sequence of N modulation symbols to be transmitted in one symbol period on the subband set is denoted as $\{d_n\} = \{d_0, d_1, d_2, \ldots, d_{N-1}\}$ (block 510). The N modulation symbols are mapped onto N sample locations in a sequence {$x_n$}. Sequence {$x_n$} has a total of K sample locations that are given indices of n=0 through K−1. The sample locations that are mapped with modulation symbols have indices n that satisfy the following:

$$n \bmod (K/M) < L. \quad \text{Eq (2)}$$

For the example shown in FIG. 5A, K/M=8, L=4, and n=0, 1, 2, 3, 8, 9, 10 and 11 satisfy equation (2). Hence, the 8 modulation symbols are mapped onto sample locations n=0, 1, 2, 3, 8, 9, 10 and 11. Zero values are mapped onto the remaining K−N sample locations to obtain the sequence of K samples, {$x_n$} (block 512).

The sequence of K samples, {$x_n$}, is then transformed to the frequency domain with a K-point DFT to obtain a sequence of K frequency-domain values, {$X_k$} (block 514). N frequency-domain values are retained and the remaining K−N frequency-domain values are replaced with zeros to form a sequence of K values, {$Y_k$} (block 516). The frequency-domain values that are retained are for the N subbands used for transmission. These subbands have indices k that satisfy the following:

$$k \bmod (K/L) < M. \quad \text{Eq (3)}$$

For the example shown in FIG. 5A, K/L=4, M=2, and k=0, 1, 4, 5, 8, 9, 12 and 13 satisfy equation (3). Hence, the frequency-domain values for subbands k=0, 1, 4, 5, 8, 9, 12 and 13 are retained, and zeros are mapped onto subbands k=2, 3, 6, 7, 10, 11, 14 and 15.

The sequence of K values, {$Y_k$}, is then transformed to the time domain with a K-point IDFT to obtain a sequence of K time-domain samples, {$y_n$} (block 518). The sequence of K samples, {$y_n$}, is then multiplied with a phase ramp to obtain a sequence of K output samples, {$z_n$} (block 520). Each output sample in sequence {$z_n$} may be generated as follows:

$$z_n = y_n \cdot e^{-j2\pi n \cdot s \cdot M/K}, \text{ for } n=0,\ldots K-1, \quad \text{Eq (4)}$$

where $y_n$ is the n-th sample in sequence {$y_n$}, $z_n$ the n-th sample in sequence {$z_n$}, and s·M is the first subband used for transmission. The multiplication with the phase ramp $e^{-j2\pi \cdot n \cdot s \cdot M/K}$ in the time domain results in sequence {$z_n$} occupying subband set s in the frequency domain.

The last C output samples of sequence {$z_n$} are copied to the start of the sequence to form an EFDMA symbol that contains K+C output samples (block 522). The C copied output samples are often called a cyclic prefix or a guard interval, and C is the cyclic prefix length. The cyclic prefix, which may or may not be utilized, is used to combat intersymbol interference (ISI) caused by frequency selective fading. The K+C output samples of the EFDMA symbol are transmitted in K+C sample periods, one output sample in each sample period. An EFDMA symbol period (or simply, a symbol period) is the duration of one EFDMA symbol and is equal to K+C sample periods. A sample period is also called a chip period.

FIG. 5A shows an exemplary transformation to generate an EFDMA symbol. This transformation results in $y_n$ being equal to $x_n$ for all sample locations where $x_n$ is not zero. Sequence {$y_n$} thus contains the N modulation symbols in the original sequence {$d_n$}, which may simplify the processing at a receiver. Sequence {$y_n$} further contains K−N interpolated samples that are constructed by "interpolating" between the non-zero locations of {$x_n$} using a DFT operation.

Figure 5B:
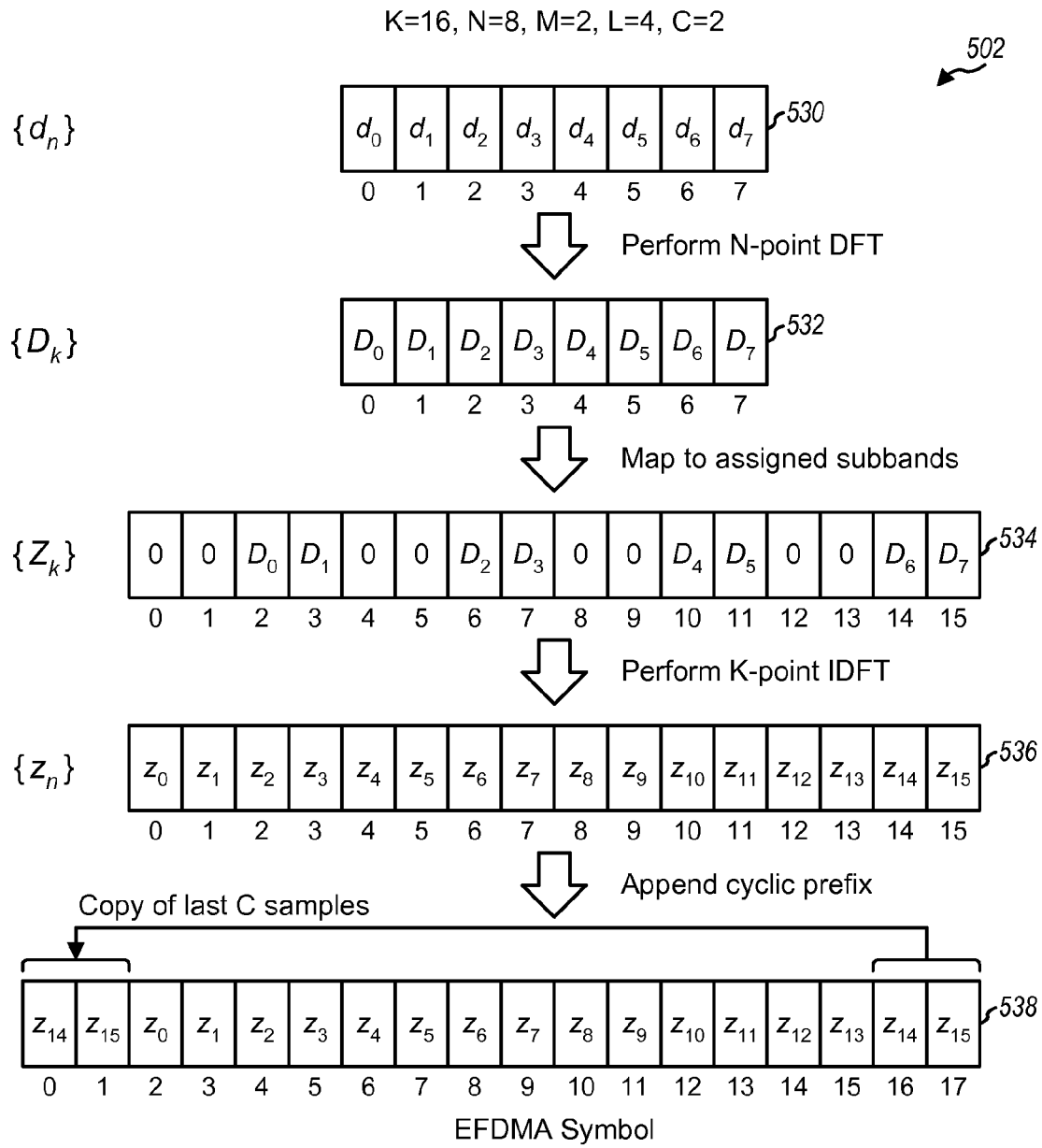

FIG. 5B shows another process 502 for generating an EFDMA symbol for one subband set. For simplicity, FIG. 5B also shows a simple case with K=16 total subbands, the subband set containing L=4 subband groups, and each group containing M=2 adjacent subbands. However, other numbers of subbands, subband sets, subband groups, and adjacent subbands may be utilized.

An original sequence of N modulation symbols to be transmitted in one symbol period on the subband set is denoted as {$d_n$}={$d_0, d_1, d_2, \ldots, d_{N-1}$} (block 530). The sequence of N modulation symbols, {$d_n$}, is transformed to the frequency domain with an N-point DFT to obtain a sequence of N frequency-domain values, {$D_k$} (block 532). The N frequency-domain values are mapped onto N subbands used for transmission, and zeros are mapped onto the remaining K−N subbands to form a sequence of K values, {$Z_k$} (block 534). For the example shown in FIG. 5B, s=1, K/M=8, L=4, and the subbands used for transmission have indices of k=2, 3, 6, 7, 10, 11, 14 and 15. Hence, the 8 frequency-domain values are mapped onto subbands k=2, 3, 6, 7, 10, 11, 14 and 15, and zeros are mapped onto subbands k=0, 1, 4, 5, 8, 9, 12 and 13.

The sequence of K values, {$Z_k$}, is then transformed to the time domain with a K-point IDFT to obtain a sequence of K time-domain samples, {$z_n$} (block 536). The last C output samples of sequence {$z_n$} are copied to the start of the sequence to form an EFDMA symbol that contains K+C output samples (block 538).

FIG. 5B shows another exemplary transformation to generate an EFDMA symbol. Sequence {$z_n$} generated by process 502 in FIG. 5B has similar temporal and spectral characteristics as sequence {$z_n$} generated by process 500 FIG. 5A. However, the samples in sequence {$z_n$} generated by process 502 may not be equal to the corresponding samples in sequence {$z_n$} generated by process 500.

In FIG. 5A, the locations that contain modulation symbols in sequence {$x_n$} may be denoted by set $N_d$, and the subbands used for transmission may be denoted by set $K_d$. Sequence {$x_n$} is such that $x_n$=0 for n∉$N_d$. The transformation may be such that sequence {$y_n$} is equal to sequence {$x_n$} for all sample locations in set $N_d$. This condition may be expressed as:

$$y_n = x_n, \text{ for } n \in N_d. \quad \text{Eq (5)}$$

The transformation may also be such that sequence {$Y_k$} is equal to sequence {$X_k$} for all subbands in set $K_d$ and is equal to zero for other subbands. This condition may be expressed as:

$$Y_k = \begin{cases} X_k & \text{for } k \in K_d, \\ 0 & \text{for } k \notin K_d. \end{cases} \quad \text{Eq (6)}$$

Sequence {$x_n$} may be represented as a K×1 vector x=[$x_0, x_1, \ldots, x_{K-1}$]$^T$, and sequence {$y_n$} may be represented as a K×1 vector y=[$y_0, y_1, \ldots, Y_{K-1}$]$^T$, where "$T$" denotes a transpose. The transformation from x to y may then be expressed as:

$$y = A \cdot x, \quad \text{Eq (7)}$$

where A is a K×K transformation matrix. In an embodiment, the transformation matrix A is defined as:

$$A = Q^{-1} \cdot D \cdot Q, \quad \text{Eq (8)}$$

where Q is a K×K transform matrix, $Q^{-1}$ is an K×K inverse transform matrix, and D is a K×K diagonal matrix. The K columns of matrix D correspond to the K total subbands. Matrix D has ones along the diagonal for the columns corresponding to the subbands used for transmission and zeros elsewhere. For the embodiment shown in FIG. 5A, Q is a K×K Fourier matrix whose (k,n)-th element, $w_{k,n}$, is defined as:

$$w_{k,n}=e^{-j2\pi\cdot k\cdot n/k}, \text{ for } k=0,\ldots,K-1 \text{ and } n=0,\ldots,K-1. \quad \text{Eq (9)}$$

The transformation matrix A may also be defined based on other transform matrices instead of the Fourier matrix. The transformation matrix A may be defined such that the $(n_2,n_1)$-th element of matrix A, $A(n_2,n_1)$, is equal to $\delta(n_2-n_1)$ for all $n_1$ and $n_2$ that are in set $N_d$. This condition ensures that $y_n=x_n$ for $n \in N_d$.

An EFDMA symbol may also be generated in other manners and with other transformations, and this is within the scope of the disclosure.

For EFDMA, the modulation symbols in the original sequence $\{d_n\}$ may be samples of the EFDMA symbol to be transmitted. Thus, after equalization at a receiver, EFDMA has similar performance as that of single-carrier FDMA schemes such as IFDMA and LFDMA. An EFDMA receiver may use frequency-domain equalization schemes applicable for IFDMA or LFDMA and may be able to achieve similar performance in the absence of channel estimation errors. EFDMA is identical to LFDMA when L=1 and is identical to IFDMA when M=1. Furthermore, EFDMA reduces to a classical single-carrier transmission when S=1 and L·M=K.

In an embodiment, S subband sets are defined for EFDMA (e.g., as shown in FIG. 4), and neighboring sectors use these same S subband sets for transmission. For this embodiment, a user $u_1$ that is assigned with subband set s in a sector observes interference from another user $u_2$ that is assigned the same subband set s in a neighbor sector. Furthermore, user $u_1$ observes interference from user $u_2$ on all N subbands in set s. If frequency hopping is used, then user $u_1$ observes interference from user $u_2$ only in time slots in which both users are assigned with the same subband set.

In another embodiment, S subband sets are defined for each sector, and different subband sets are defined for neighboring sectors. For this embodiment, a subband set for a given sector may overlap partially but not completely with any subband set for a neighbor sector. Hence, no subband set for a given sector contains all of the subbands in any subband set for a neighbor sector. For this embodiment, a user $u_1$ that is assigned subband set s in a sector may observe interference from another user $u_2$ in a neighbor sector on some but not all of the subbands in set s. This embodiment provides interference diversity since user $u_1$ does not observe interference from a single user in another sector across all of the subbands assigned to user $u_1$.

Figure 6:
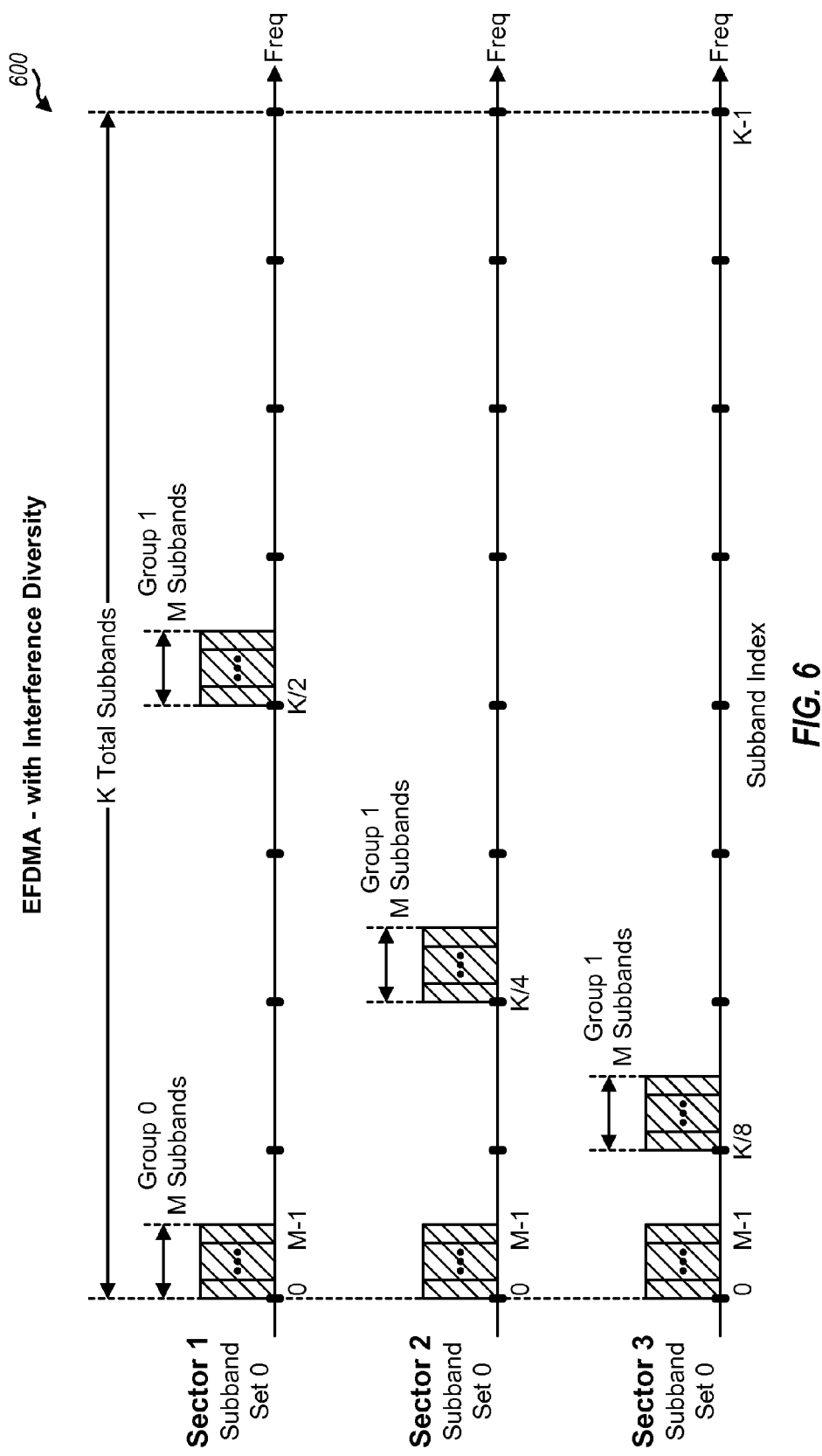
FIG. 6 shows EFDMA subband sets.

FIG. 6 shows an exemplary EFDMA subband structure 600. For the example shown in FIG. 6, L=2 and each subband set contains two groups of M subbands. For sector 1, subband set 0 contains subbands 0 through M−1 and K/2 through K/2+M−1. For sector 2, subband set 0 contains subbands 0 through M−1 and K/4 through K/4+M−1. For sector 3, subband set 0 contains subbands 0 through M−1 and K/8 through K/8+M−1. The remaining subband sets for each sector may be defined in various manners. For example, subband set 1 for sector 1 may include subbands M through 2M−1 and K/2+M through K/2+2M−1, subband set 1 for sector 2 may include subbands K/2 through K/2+M−1 and 3K/4 through 3K/4+M−1, and subband set 1 for sector 3 may include subbands K/2 through K/2+M−1 and 5K/8 through 5K/8+M−1. Each subband set for each sector may include some but not all of the subbands in any subband set for any neighbor sector.

A user $u_1$ assigned with subband set 0 in sector 1 would overlap partially with another user $u_2$ assigned with subband set 0 in sector 2 and would also overlap partially with another user $u_3$ assigned with subband set 0 in sector 3. User $u_1$ would then observe interference from users $u_2$ and $u_3$ on subbands 0 through M−1, which are shared by these three users. User $u_1$ would also overlap partially with other users assigned with subbands K/2 through K/2+M−1 in the neighbor sectors and would also observe interference from these users on these subbands.

For the case of L=2, the spacing between two groups of subbands may take on values of K/2, K/4, K/8, ..., M. Thus, the level of interference diversity achievable corresponds to about log(K/M) choices.

EFDMA symbols may be generated for the different subband sets in FIG. 6 in various manners. For clarity, the following description is for the case with K=32 total subbands, each subband set containing L=2 subband groups, and each group containing M=4 adjacent subbands. Subband set 0 for sector 1 contains subbands 0, 1, 2, 3, 16, 17, 18 and 19, subband set 0 for sector 2 contains subbands 0, 1, 2, 3, 8, 9, and 11, and subband set 0 for sector 3 contains subbands 0, 1, 2, 3, 4, 5, 6 and 7.

An EFDMA symbol for subband set 0 in sector 1 may be generated as follows:
1. Map 8 modulation symbols onto sample locations 0, 1, 8, 9, 16, 17, 24 and 25, and map zeros onto the 24 remaining sample locations;
2. Perform a 32-point DFT on the sequence of 32 samples to obtain a sequence of 32 frequency-domain values;
3. Retain the frequency-domain values for subbands 0, 1, 2, 3, 16, 17, 18 and 19 and zero out the 24 remaining subbands;
4. Perform a 32-point IDFT on the sequence of 32 values to generate a sequence of 32 time-domain samples; and
5. Append a cyclic prefix to form the EFDMA symbol for subband set 0 in sector 1.

An EFDMA symbol for subband set 0 in sector 2 may be generated as follows:
1. Map 8 modulation symbols onto sample locations 0, 2, 8, 10, 16, 18, 24 and 26, and map zeros onto the 24 remaining sample locations;
2. Perform a 32-point DFT on the sequence of 32 samples to obtain a sequence of 32 frequency-domain values;
3. Retain the frequency-domain values for subbands 0, 1, 2, 3, 8, 9, 10 and 11 and zero out the 24 remaining subbands;
4. Perform a 32-point IDFT on the sequence of 32 values to generate a sequence of 32 time-domain samples; and
5. Append a cyclic prefix to form the EFDMA symbol for subband set 0 in sector 2.

An EFDMA symbol for subband set 0 in sector 3 may be generated as follows:
1. Map 8 modulation symbols onto sample locations 0, 4, 8, 12, 16, 20, 24 and 28, and map zeros onto the 24 remaining sample locations;
2. Perform a 32-point DFT on the sequence of 32 samples to obtain a sequence of 32 frequency-domain values;
3. Retain the frequency-domain values for subbands 0, 1, 2, 3, 4, 5, 6 and 7 and zero out the 24 remaining subbands;
4. Perform a 32-point IDFT on the sequence of 32 values to generate a sequence of 32 time-domain samples; and
5. Append a cyclic prefix to form the EFDMA symbol for subband set 0 in sector 3.

EFDMA symbols may also be generated in other manners for sectors 1, 2 and 3. For example, an EFDMA symbol for subband set 0 in sector 2 may be generated by (1) mapping 8 modulation symbols onto sample locations 0, 1, 4, 5, 8, 9, 12 and 13 and mapping zeros onto sample locations 2, 3, 6, 7, 10, 11, 14 and 15, (2) performing a 16-point DFT, (3) zeroing out subbands 4, 5, 6, 7, 12, 13, 14 and 15, (4) appending 16 zeros at the end to obtain a sequence of 32 values, (5) performing a 32-point IDFT, and (6) appending a cyclic prefix. The EFDMA symbol is thus initially generated as if it is sent on a subband set formed over the first K/2 subbands (or a portion of the system bandwidth) and is then expanded to cover all K total subbands by zero padding to the required degree.

As shown in FIG. 6, the L subband groups for a given subband set may be uniformly distributed across the system bandwidth (e.g., as shown for sector 1) or non-uniformly distributed across the system bandwidth (e.g., as shown for sectors 2 and 3).

In an embodiment, non-uniformly distributed subband groups for a given subband set may be defined as follows. Group 0 contains subbands $a_0 \cdot L \cdot M$ through $a_0 \cdot (L+1) \cdot M-1$, group 1 contains subbands $(a_1 \cdot L+1) \cdot M$ through $(a_1 \cdot L+2) \cdot M-1$, group 2 contains subbands $(a_2 \cdot L+2) \cdot M$ through $(a_2 \cdot L+3) \cdot M-1$, and so on, where $a_0, a_1, a_2, \ldots$ may each be any non-negative integer value. The set can contain different subband groups depending on the values selected for $a_0, a_1, a_2 \ldots$. The set contains subbands $(a_l \cdot L+l) \cdot M+m$, for $l=0, \ldots, L-1$ and $m=0, \ldots, M-1$. S subband sets may be defined based on S different offsets. For example, $a_l$ may be a function of set index s and may be defined as $a_l = a \cdot l + s$, where a is a fixed value for all S subband sets. As an example, for M=8, L=4, and a=5, set s=0 contains subbands 0 through 7, 50 through 57, 100 through 107, and 150 through 157, set s=1 contains subbands 8 through 15, 58 through 63, 108 through 115, and 158 through 165, and so on.

The subband groups for a given set may be static, which may simplify operation. The subband groups for a given set may also vary dynamically over time, which may provide interference diversity and other benefits. The S subband sets for a sector may be static or may vary dynamically. Alternatively, only some of the subband sets may vary dynamically and the remaining subband sets may be static.

Figure 7:
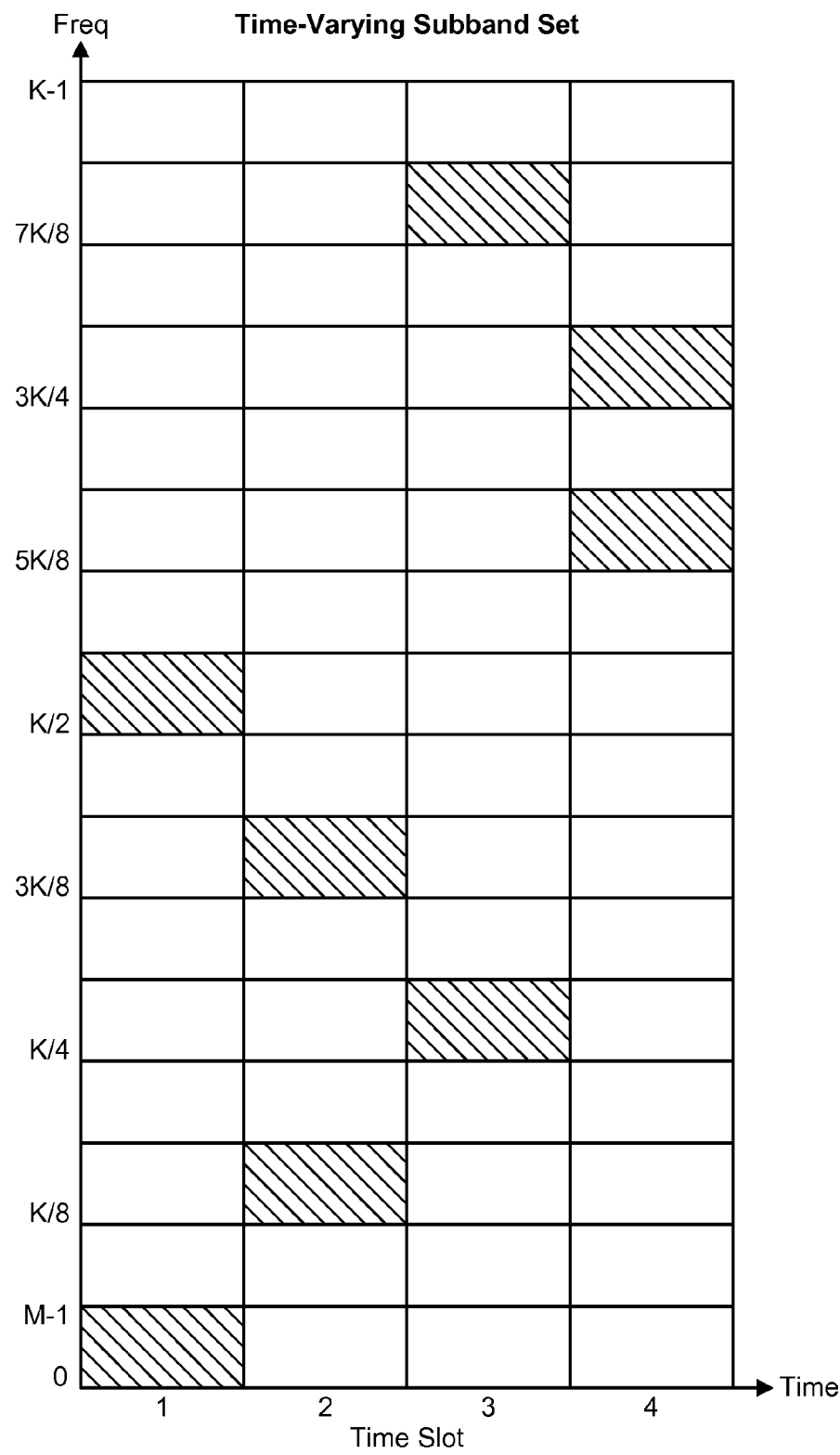
FIG. 7 shows a time-varying subband set for EFDMA.

FIG. 7 shows an exemplary time-varying subband set for EFDMA. For the example shown in FIG. 7, the subband set contains two different groups of M subbands in different time slots. For this example, the subband set contains subband 0 through M−1 and K/2 through K/2+M−1 in time slot 1, subbands K/8 through K/8+M−1 and 3K/8 through 3K/8+M−1 in time slot 2, subbands K/4 through K/4+M−1 and 7K/8 through 7K/8+M−1 in time slot 3, subband 5K/8 through 5K/8+M−1 and 3K/4 through 3K/4+M−1 in time slot 4, and so on. In general, the set may contain any groups of subbands in each time slot, and the groups need not start at an integer multiple of K/8. Other subband sets may be defined such that all of the K total subbands are allocated to the S subband sets.

In general, for interference diversity, different subband sets may be defined for neighboring sectors. The S subband sets for each sector may be static to facilitate frequency planning for a wireless network. Alternatively, the S subband sets for each sector may vary dynamically (e.g., as shown in FIG. 7), which can randomize interference. For each sector, the L subband groups for each set may be spaced apart by any number of subbands. Furthermore, the subband groups for each set may be static or may vary dynamically (e.g., based on a predetermined sequence, a pseudo-random sequence, and so on).

Interference diversity may also be achieved with LFDMA. For example, the S subband groups for sector 1 may be defined such that group 0 contains subbands 0 through N−1, group 1 contains subbands N through 2N−1, group 2 contains subbands 2N through 3N−1, and so on, as shown in FIG. 3. The S subband groups for sector 2 may be staggered by N/2 subbands from the subband groups for sector 1. In this case, for sector 2, group 0 contains subbands N/2 through 3N/2−1, group 1 contains subbands 3N/2 through 5N/2−1, group 2 contains subbands 5N/2 through 7N/2−1, and so on. A user assigned with a subband group in sector 1 would then observe interference from two users in sector 2.

Figures 8, 9:
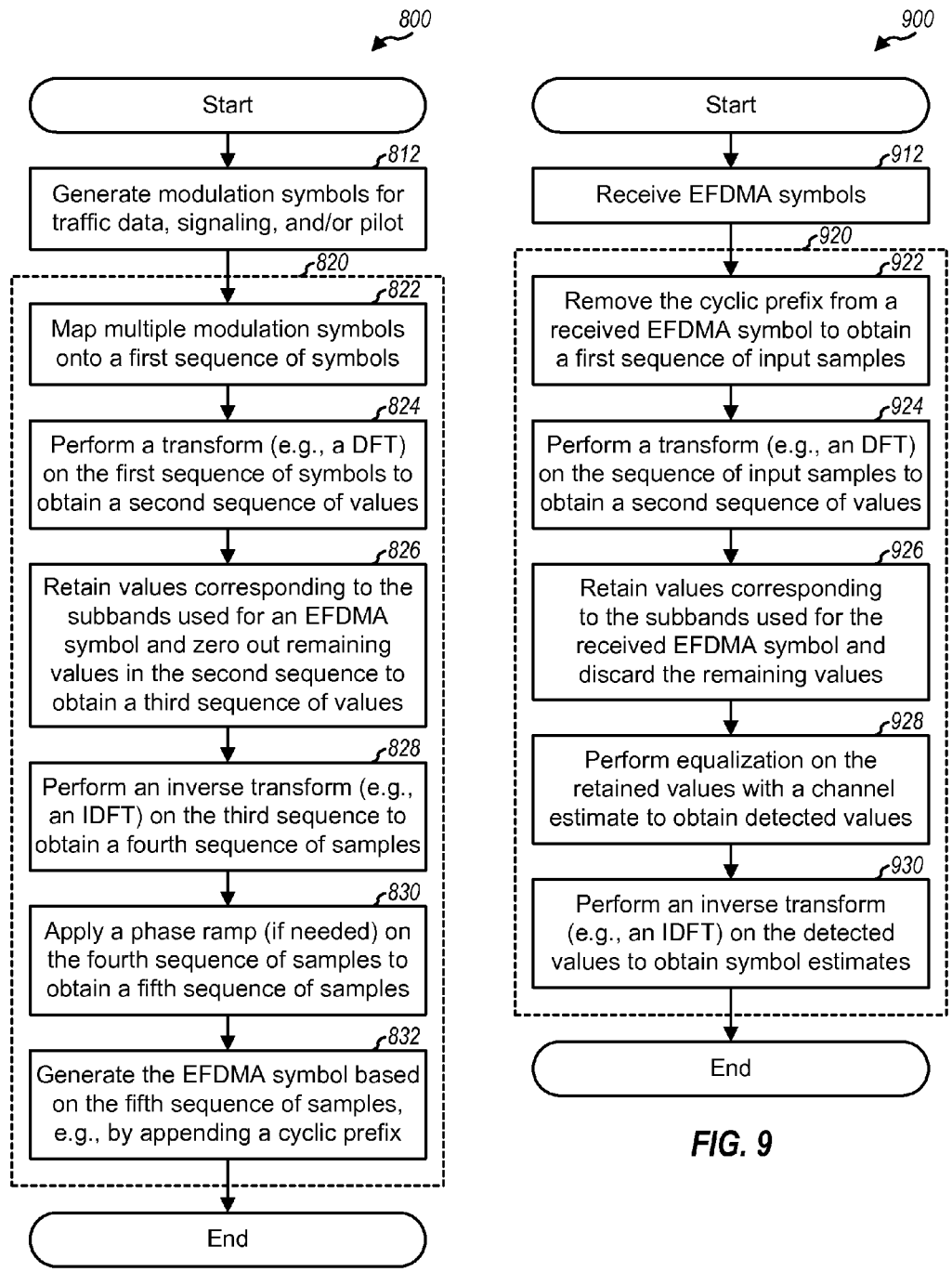
FIG. 8 shows a process for generating EFDMA symbols.
FIG. 9 shows a process for receiving EFDMA symbols.

FIG. 8 shows a process 800 for generating EFDMA symbols. Modulation symbols are generated, e.g., for traffic data, signaling, pilot, or a combination thereof (block 812). EFDMA symbols (or transmission symbols) are then generated for the modulation symbols, e.g., as shown in FIG. 5A or 5B. For clarity, FIG. 8 shows EFDMA symbol generation based on process 500 shown in FIG. 5A.

Block 820 shows the processing to generate one EFDMA symbol. Multiple modulation symbols are mapped onto a first sequence of symbols, e.g., at locations determined based on equation (2) (block 822). A transform (e.g., a DFT) is performed on the first sequence of symbols to obtain a second sequence of values (block 824). The values in the second sequence corresponding to the subbands used for the EFDMA symbol are retained, and the remaining values are zeroed out to obtain a third sequence of values (block 826). The subbands used for the EFDMA symbol may be determined, e.g., based on equation (1) for the subband structure shown in FIG. 4. An inverse transform (e.g., an IDFT) is performed on the third sequence to obtain a fourth sequence of samples (block 828). A phase ramp may be applied on the fourth sequence of samples to obtain a fifth sequence of samples (block 830). The EFDMA symbol is then generated based on the fifth sequence of samples, e.g., by appending a cyclic prefix to the fifth sequence (block 832).

FIG. 9 shows a process 900 for receiving EFDMA symbols. EFDMA symbols are received from a transmitter (block 912). Each received EFDMA symbol is processed in block 920 to recover the modulation symbols sent in that EFDMA symbol.

For each received EFDMA symbol, the cyclic prefix is removed to obtain a first sequence of input samples (block 922). A transform (e.g., a K-point DFT) is performed on the sequence of input samples to obtain a second sequence of values (block 924). The values in the second sequence corresponding to the subbands used for the received EFDMA symbol are retained, and the remaining values are discarded (block 926). The retained values are processed to obtain symbol estimates for the modulation symbols sent in the received EFDMA symbol. This processing may be performed in different manners depending on the manner in which the modulation symbols are sent, the manner in which the EFDMA symbol is generated, and so on. For example, frequency-domain equalization or some other form of data detection may be performed on the retained values with a channel estimate for the transmitter to obtain detected values (block 928). An inverse transform (e.g., an N-point IDFT) may then be performed on the detected values to obtain the symbol estimates, which are estimates of the modulation symbols sent in the received EFDMA symbol (block 930).

Figure 10:
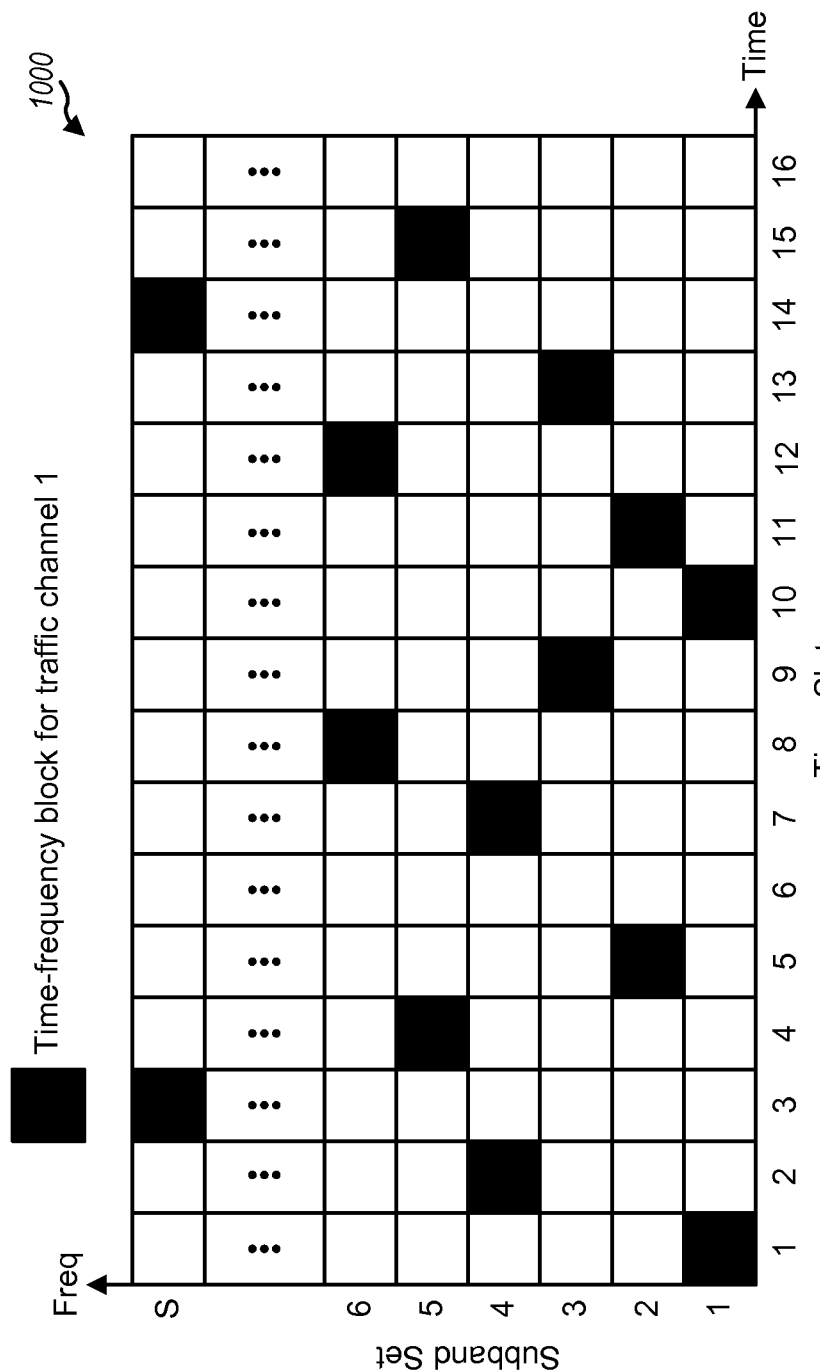
FIG. 10 shows a frequency hopping (FH) scheme.

FIG. 10 shows a frequency hopping (FH) scheme 1000 that may be used in system 100 for the forward and/or reverse link. Frequency hopping can provide frequency diversity and interference randomization. With frequency hopping, a user may be assigned a traffic channel that is associated with a hop pattern that indicates which subband set(s), if any, to use in each time slot. The subband sets available for transmission may be defined based on EFDMA or some other multiplexing scheme. A hop pattern is also called an FH pattern or sequence, and a time slot is also called a hop period. A time slot is the amount of time spent on a given subband set and typically spans multiple symbol periods. The hop pattern may pseudo-randomly select different subband sets in different time slots.

In an embodiment, one channel set is defined for each link. Each channel set contains S traffic channels that are orthogonal to one another so that no two traffic channels map to the same subband in any given time slot. This avoids intra-sector interference among users assigned to traffic channels in the same channel set. Each traffic channel is mapped to a specific sequence of time-frequency blocks based on the hop pattern for that traffic channel. A time-frequency block is a specific set of subbands in a specific time slot. For this embodiment, up to S users may be assigned the S traffic channels and would be orthogonal to one another.

Figure 11:
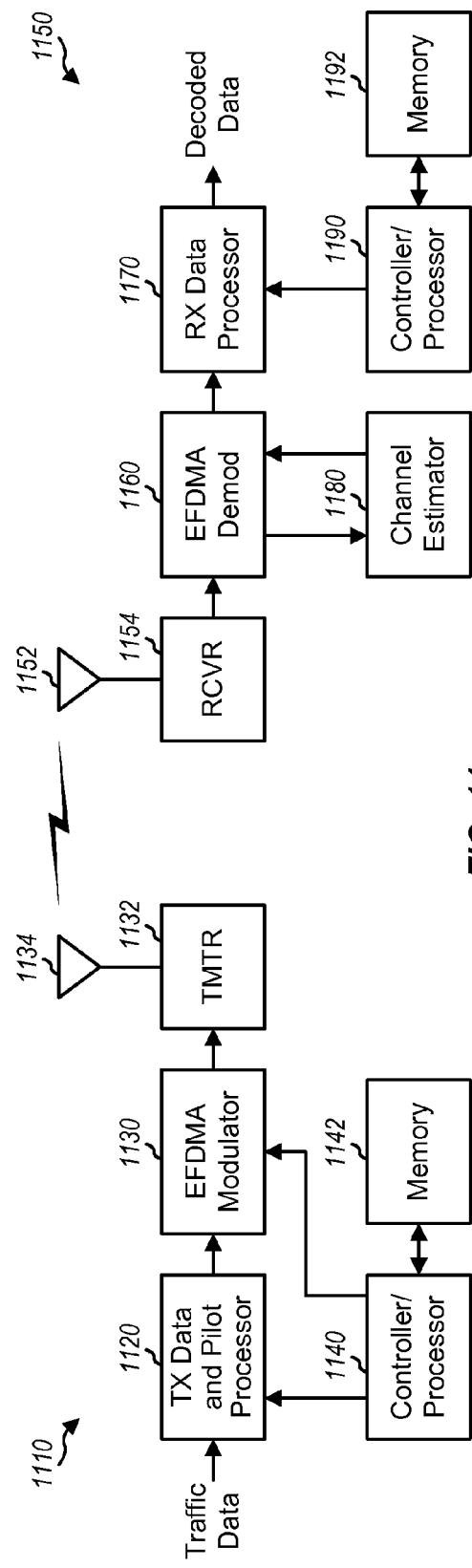
FIG. 11 shows a block diagram of a transmitter and a receiver.

FIG. 11 shows a block diagram of a transmitter 1110 and a receiver 1150. For the forward link, transmitter 1110 is part of a base station and receiver 1150 is part of a terminal. For the reverse link, transmitter 1110 is part of a terminal and receiver 1150 is part of a base station.

At transmitter 1110, a transmit (TX) data and pilot processor 1120 encodes, interleaves, and symbol maps data (e.g., traffic data and signaling) and generates data symbols. Processor 1120 also generates pilot symbols and multiplexes the data symbols and pilot symbols. As used herein, a data symbol is a modulation symbol for data, a pilot symbol is a modulation symbol for pilot, a modulation symbol is a complex value for a point in a signal constellation (e.g., for PSK or QAM), and a symbol is a complex value. An EFDMA modulator 1130 performs EFDMA modulation (e.g., as shown in FIG. 5A or 5B) and generates EFDMA symbols. A transmitter unit (TMTR) 1132 processes (e.g., converts to analog, amplifies, filters, and frequency upconverts) the EFDMA symbols and generates a radio frequency (RF) modulated signal, which is transmitted via an antenna 1134.

At receiver 1150, an antenna 1152 receives the transmitted signal and provides a received signal. A receiver unit (RCVR) 1154 conditions (e.g., filters, amplifies, frequency downconverts, and digitizes) the received signal and provides input samples. An EFDMA demodulator (Demod) 1160 performs EFDMA demodulation on the input samples (e.g., as shown in FIG. 9) and provides received data values and received pilot values for subbands used for data and pilot transmission. A channel estimator 1180 derives a channel estimate based on the received pilot values. EFDMA demodulator 1160 also performs data detection (or equalization) on the received data values with the channel estimate and provides data symbol estimates for transmitter 1110. A receive (RX) data processor 1170 symbol demaps, deinterleaves, and decodes the data symbol estimates and provides decoded data. In general, the processing by EFDMA demodulator 1160 and RX data processor 1170 at receiver 1150 is complementary to the processing by EFDMA modulator 1130 and TX data and pilot processor 1120, respectively, at transmitter 1110.

Controllers/processors 1140 and 1190 direct the operation of various processing units at transmitter 1110 and receiver 1150, respectively. Memories 1142 and 1192 store program codes and data for transmitter 1110 and receiver 1150, respectively.

Figure 12:
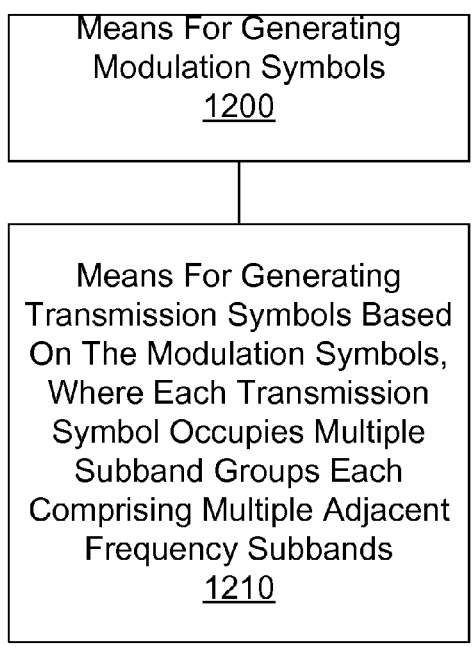
FIG. 12 shows a block diagram of a transmitter for generating EFDMA symbols.

FIG. 12 shows a block diagram of a transmitter for generating EFDMA symbols. Means 1200 for generating modulation symbols is coupled to means 1210. Means 1210 is for generating transmission symbols based on the modulation symbols, where each transmission symbol occupies multiple subband groups each comprising multiple adjacent frequency subbands. This means 1210 may operate as described, for example, with respect to FIG. 8.

Figure 13:
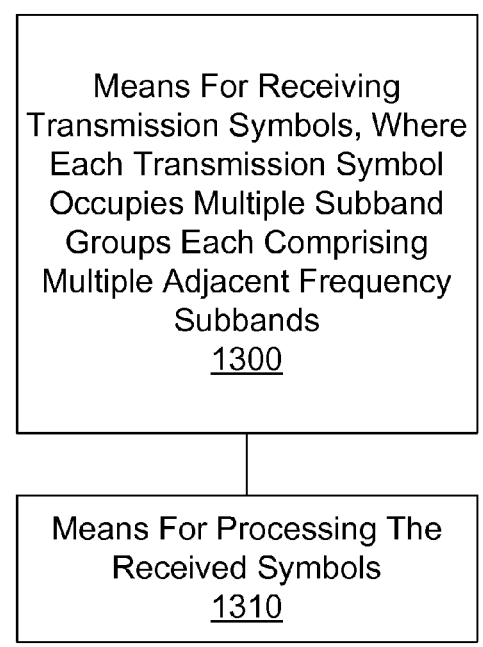
FIG. 13 shows a block diagram of a receiver for receiving EFDMA symbols.

FIG. 13 shows a block diagram of a receiver for receiving EFDMA symbols. Means 1300 for receiving transmission symbols, where each transmission symbol occupies multiple subband groups each comprising multiple adjacent frequency subbands, is coupled to means 1310 for processing the received symbols. This means 1300 may operate as described, for example, with respect to FIG. 9.

The multiplexing schemes described herein may be implemented by various means. For example, the processing at a transmitter or a receiver may be implemented in hardware, software, or a combination thereof. For a hardware implementation, the processing units used to generate EFDMA symbols at the transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used to process received EFDMA symbols at the receiver may also be implemented within one or more ASICs, DSPs, processors, and so on.

For a software implementation, the processing may be implemented with modules (e.g., procedures, functions, and so on) that perform the functions described herein. The software codes may be stored in a memory (e.g., memory 1142 or 1192 in FIG. 11) and executed by a processor (e.g., processor 1140 or 1190). The memory may be implemented within the processor or external to the processor.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus comprising:
   a processor configured to generate modulation symbols and to generate transmission symbols based on the modulation symbols, wherein for each transmission symbol the processor is configured to map multiple modulation symbols onto a first sequence of symbols, to perform a transform on the first sequence of symbols to obtain a second sequence of values, to zero out selected ones of the values in the second sequence to obtain a third sequence, to perform an inverse transform on the third sequence to obtain a fourth sequence of samples, and to generate the transmission symbol based on the fourth sequence of samples; and
   a memory coupled to the processor.

2. The apparatus of claim 1, wherein each transmission symbol occupies multiple subband groups that are uniformly distributed across the frequency band.

3. The apparatus of claim 1, wherein each transmission symbol occupies multiple subband groups, and wherein the multiple subband groups for at least one transmission symbol are non-uniformly distributed across the frequency band.

4. The apparatus of claim 1, wherein each transmission symbol occupies multiple subband groups in a frequency band, wherein the frequency band comprises K total frequency subbands, wherein S sets of frequency subbands are formed with the K total frequency subbands, each set comprising L subband groups, each subband group comprising M adjacent frequency subbands among the K total frequency subbands, where K, S, L, and M are each an integer greater than one, and wherein each transmission symbol occupies at least one set of frequency subbands.

5. The apparatus of claim 4, wherein the processor is configured to determine frequency subbands for each transmission symbol based on the following:

$$s \cdot M \leq k \text{ modulo } (K/L) < (s+1) \cdot M,$$

where k is an index for frequency subband and s is an integer between 0 and K/(L·M)−1.

6. The apparatus of claim 4, wherein the processor is configured to map multiple modulation symbols for each transmission symbol to a sequence at locations determined based on the following:

$$n \text{ modulo } (K/M) < L,$$

where n is an index for the locations in the sequence.

7. The apparatus of claim 1, wherein for each transmission symbol the processor is configured to apply a phase ramp to the fourth sequence of samples to obtain a fifth sequence of samples and to generate the transmission symbol based on the fifth sequence of samples.

8. The apparatus of claim 1, wherein for each transmission symbol the processor is configured to perform a discrete Fourier transform (DFT) or a fast Fourier transform (FFT) on the first sequence of symbols and to perform an inverse DFT (IDFT) or an inverse FFT (IFFT) on the third sequence.

9. The apparatus of claim 4, wherein the processor is configured to maintain the S sets of frequency subbands as static.

10. The apparatus of claim 4, wherein the processor is configured to vary at least one of the S sets of frequency subbands dynamically over time.

11. The apparatus of claim 4, wherein multiple sectors are associated with different S sets of frequency subbands, and wherein each set of frequency subbands for each sector does not completely overlap any set of frequency subbands for each remaining sector among the multiple sectors.

12. The apparatus of claim 1, wherein the processor is configured to determine different subband sets to use for transmission in different time slots, each subband set comprising different subband groups, each subband group comprising multiple adjacent frequency subbands.

13. The apparatus of claim 12, wherein the processor is configured to determine the different subband sets to use for transmission in the different time slots based on a frequency hopping pattern.

14. The apparatus of claim 1, further comprising:
a transmitter configured to transmit the transmission symbols via a reverse link to a base station.

15. The apparatus of claim 1, further comprising:
a transmitter configured to transmit the transmission symbols via a forward link to a terminal.

16. A method comprising:
generating modulation symbols; and
generating transmission symbols based on the modulation symbols, wherein the generating the transmission symbols comprises, for each transmission symbol, mapping multiple modulation symbols onto a first sequence of symbols, performing a transform on the first sequence of symbols to obtain a second sequence of values, zeroing out selected ones of the values in the second sequence to obtain a third sequence, performing an inverse transform on the third sequence to obtain a fourth sequence of samples, and generating the transmission symbol base on the fourth sequence of samples.

17. The method of claim 16, further comprising:
determining frequency subbands for each transmission symbol based on the following:

$$s \cdot M \leq k \text{ modulo } (K/L) < (s+1) \cdot M,$$

where
K is the total number of frequency subbands in the frequency band,
L is the number of subband groups used for the transmission symbol,
M is the number of subbands in each subband group,
k is an index for frequency subband, and
s is an integer between 0 and K/(L·M)−1.

18. An apparatus comprising:
means for generating modulation symbols; and
means for generating transmission symbols based on the modulation symbols, wherein the means for generating the transmission symbols comprises, for each transmission symbol,
means for mapping multiple modulation symbols onto a first sequence of symbols,
means for performing a transform on the first sequence of symbols to obtain a second sequence of values,
means for zeroing out selected ones of the values in the second sequence to obtain a third sequence,
means for performing an inverse transform on the third sequence to obtain a fourth sequence of samples, and
means for generating the transmission symbol based on the fourth sequence of samples.

19. The apparatus of claim 18, further comprising:
means for determining frequency subbands for each transmission symbol based on the following:

$$s \cdot M \leq k \text{ modulo } (K/L) < (s+1) \cdot M,$$

where
K is the total number of frequency subbands in the frequency band,
L is the number of subband groups used for the transmission symbol,
M is the number of subbands in each subband group,
k is an index for frequency subband, and
is an integer between 0 and K/(L·M)−1.

20. An apparatus comprising:
a processor configured to process received transmission symbols to obtain estimates of modulation symbols sent in the transmission symbols, wherein for each transmission symbol the processor is configured to remove a cyclic prefix from the received transmission symbol to obtain a first sequence of input samples, to perform a transform on the first sequence of input samples to obtain a second sequence of values, to retain values in the second sequence corresponding to frequency subbands used for the received transmission symbol, and to process the retained values to obtain estimates of the multiple modulation symbols sent in the received transmission symbol; and
a memory coupled to the processor.

21. The apparatus of claim 20, wherein for each received transmission symbol the processor is configured to perform equalization on the retained values with a channel estimate to obtain detected values and to perform an inverse transform on the detected values to obtain the estimates of the multiple modulation symbols sent in the received transmission symbol.

22. The apparatus of claim 20, wherein for each received transmission symbol the processor is configured to perform a discrete Fourier transform (DFT) or a fast Fourier transform (FFT) on the sequence of input samples and to perform an inverse DFT (IDFT) or an inverse FFT (IFFT) on the detected values.

23. The apparatus of claim 20, wherein the processor is configured to determine different subband sets used for transmission in different time slots, each subband set comprising different subband groups, each subband group comprising multiple adjacent frequency subbands.

24. A method comprising:
receiving transmission symbols; and
processing the received transmission symbols to obtain estimates of modulation symbols sent in the transmission symbols, wherein the processing the received transmission symbols comprises, for each received transmission symbol, removing a cyclic prefix from the received transmission symbol to obtain a first sequence of input samples, performing a transform on the first sequence of input samples to obtain a second sequence of values, retaining values in the second sequence corresponding to frequency subbands used for the received transmission symbol, processing the retained values to obtain estimates of the multiple modulation symbols sent in the received transmission symbol.

25. The method of claim 24, wherein the processing the received transmission symbols further comprises, for each received transmission symbol,
performing equalization on the retained values with a channel estimate to obtain detected values and
performing an inverse transform on the detected values to obtain the estimates of the multiple modulation symbols sent in the received transmission symbol.

26. An apparatus comprising:
means for receiving transmission symbols; and
means for processing the received transmission symbols to obtain estimates of modulation symbols sent in the transmission symbols, wherein the means for processing the received transmission symbols comprises, for each received transmission symbol,
means for removing a cyclic prefix from the received transmission symbol to obtain a first sequence of input samples,
means for performing a transform on the sequence of input samples to obtain a second sequence of values,
means for retaining values in the second sequence corresponding to frequency subbands used for the received transmission symbol, and
means for processing the retained values to obtain estimates of the multiple modulation symbols sent in the received transmission symbol.

27. The apparatus of claim 26, wherein the means for processing the received transmission symbols further comprises, for each received transmission symbol,
means for performing equalization on the retained values with a channel estimate to obtain detected values and
means for performing an inverse transform on the detected values to obtain the estimates of the multiple modulation symbols sent in the received transmission symbol.

\* \* \* \* \*